Jan. 13, 1948.　　　A. M. CHAMBERS, JR　　　2,434,484
OIL SEAL
Filed Feb. 9, 1945　　　2 Sheets-Sheet 1

INVENTOR.
Albert M. Chambers Jr.
BY
Fraser, Myers & Manley
his attorneys

Jan. 13, 1948.  A. M. CHAMBERS, JR  2,434,484
OIL SEAL
Filed Feb. 9, 1945  2 Sheets-Sheet 2

INVENTOR.
Albert M. Chambers, Jr.
BY
Fraser, Myers & Manley
his attorneys

Patented Jan. 13, 1948

2,434,484

UNITED STATES PATENT OFFICE 2,434,484

OIL SEAL

Albert M. Chambers, Jr., Pittsford, N. Y., assignor to The Garlock Packing Company, Palmyra, N. Y., a corporation of New York Application February 9, 1945, Serial No. 577,113

8 Claims. (Cl. 288—3)

My present invention relates to improvements in seals adapted to prevent the passage of oil or other fluid or of dust or other foreign matter along an annular space between a pair of machine elements which are movable relatively to each other, such as, for example, a rotatable shaft and a housing in which the shaft is mounted. The invention, although useful in such seals of various overall diameters, nevertheless, is particularly useful in seals provided for use with respect to machine elements of relatively substantial diameter. As a matter of convenience, and without thereby limiting the invention, it is described hereinafter as embodied in an oil seal.

Oil seals ordinarily comprise a flexible annular sealing element one portion of which is fixed in sealing relation to one of the machine elements and another portion commonly called a sealing lip, which is in a wiping sealing relation to the other of the machine elements. The flexible characteristic of the sealing lip may suffice for holding it in constant wiping contact with the latter machine element but it is common practice to provide resilient means such as a spring for holding the sealing lip in such wiping contact. Annular coiled garter springs have been found well suited to this purpose.

Difficulty has been encountered, however, in providing means for holding a garter spring in place in an assembled or unitary oil seal, particularly in seals for use with shafts of substantial diameter such as the rolls or roll necks in steel-rolling mills which may have diameters of thirty inches more or less. This difficulty will be more clearly understood from the following description.

It has been found, also that the coils of the garter spring have a tendency to work into the relatively soft back of the sealing lip, weakening the latter and also imparting an undesirable snubbing or damping effect upon the action of the spring.

An important object of the present invention is the provision, in an oil seal, of improved means for holding a garter spring against dislodgement.

Another important object is the provision of a single element serving both to prevent the garter spring from imbedding itself in the sealing element and thereby snubbing or damping its action and to hold the garter spring against dislodgement.

These and other important objects are achieved by the present invention, several embodiments of which are shown, purely for illustrative purposes, in the accompanying drawings, in which—

Figure 1 is an axial sectional view of an oil seal according to the present invention, the seal being mounted in the annular space between an outer machine element or casing and a shaft extending therewithin. In this view the shaft is broken away axially to indicate that the diameter of the shaft relatively to the sectional diameter of the oil seal is substantially greater than shown in the drawing. The diameter of the shaft, for example, may be thirty times, more or less, than the sectional diameter of the oil seal.

Figure 3:
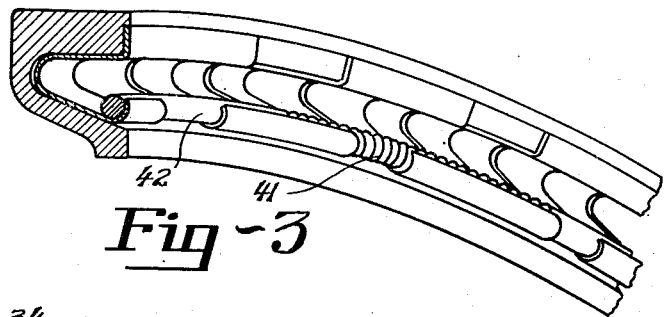
Fig. 3 is a fragmentary perspective view of the sealing element of the embodiment shown in Fig. 1, including a spring assembly associated therewith.
Figure 4:
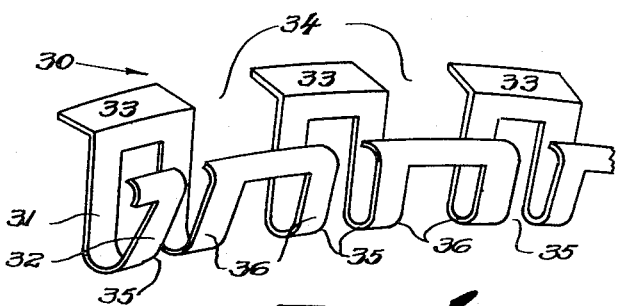

Fig. 4 is a fragmentary perspective view, in a somewhat different attitude, of an element included in Fig. 3. This element, preferably, is of flat, relatively hard material such as metal. As such an element serves as carrying means for a garter spring and is notched to provide plural fingers, all of which advantageously may be of spring material, the said element may also be referred to hereinafter for convenience as a carrier or as a finger spring.

Figure 5:
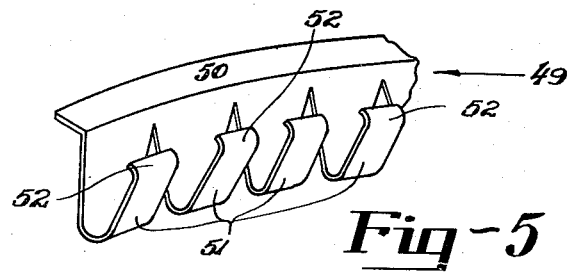

Fig. 5 is a fragmentary perspective view in substantially the same attitude as Fig. 4, showing another of various designs or types of finger springs or carriers which may be employed in the present invention.

Figs. 6, 7, 8 and 9 are sectional views illustrating further embodiments of the invention.

Figure 11:
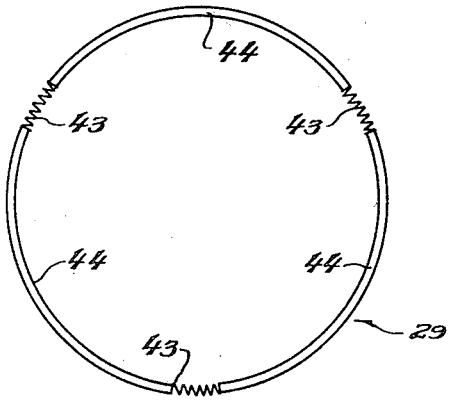
Figure 10:
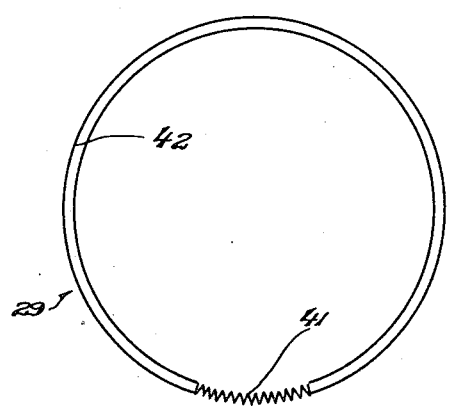

Figs. 10 and 11 are elevational views illustrating several types of garter springs which may be used advantageously in the present invention.

Figure 12:
Figure 13:
Figure 14:

Figs. 12, 13 and 14 are fragmentary views illustrating various means for interconnecting extensible and non-extensible circumferential sections of springs of the character illustrated in Figs. 10 and 11.

Referring to Figs. 1-4, the invention is illustrated as embodied in a unitary oil seal disposed in an annular space A between a first machine element in the form of a shaft B and a second machine element in the form of a casing C. The seal is designed to prevent the passage of oil axially along the space A.

The oil seal comprises a rigid shell 20, preferably of suitable metal, having a peripheral cylindrical portion 21 adapted to be oil-tightly fitted into the casing C and a radial flange 22 extending inwardly from one side of the cylindrical portion 21 and terminating inwardly at a distance from the shaft B. A cylindrical body portion 23 of a flexible sealing element 24 is disposed within the shell in oil tight contact with the inner sides of the portion 21 and the flange 22 of the shell. The sealing element has a sealing flange 25 preferably having a somewhat enlarged marginal sealing lip 26, and the said sealing flange converges inwardly from one side of the body portion 23 to bring the sealing lip 26 into wiping sealing contact with the shaft B.

The sealing element preferably may be so proportioned that its body portion 23 may be somewhat compressed into the cylindrical portion 21 of the shell and the said body portion of the sealing element may be firmly held against the inner side of the flange 22 of the shell by a flat rigid retaining ring 27, which, after the mentioned parts are assembled, is locked in place by a locking lip 28 formed by swaging or turning in the marginal material of the cylindrical portion of the shell. The axial pressure of the retaining ring 27 upon the body portion 23 of the sealing element, of course, may enhance the latter's engagement with the cylindrical portion 21 of the shell.

Although the inherent resiliency of the sealing element and particularly of the sealing flange 25 and the sealing lip 26 may be relied upon for urging and holding the said lip into sealing contact with the shaft B, it has been found highly desirable to employ a garter spring for that purpose, particularly in oil seals for shafts of large diameter.

According to the present invention, means are provided for holding a garter spring 29 in place in the oil seal while permitting said spring to coact freely with the sealing lip 26, without any material snubbing action, to urge or hold the sealing lip in effective sealing engagement with the shaft.

The mentioned spring holding means, as illustrated in Figs. 1–4, comprise an annular spring-carrier 30 preferably of flat, relatively hard and pliant or flexible material, such as a suitable metal, the said carrier being of angular cross section, having flanges 31 and 32 which respectively lie in intimate contact with the inner surface of the body portion 23 and the outer surface of the sealing flange 25.

One of numerous types of spring-carriers which may be employed in the present invention is shown in Fig. 4 and comprises a sectionalized annular peripheral flange 33, the plural similar sections of which are separated by gaps 34 extending through the flanges 31 and substantially into or partially through flanges 32. Slots 35 located at regular intervals about the carrier 30 form fingers 36 the ends of which are rolled or bent outwardly to form spring-retaining lips 37 which, with adjacent portions of the fingers 36, form an annular trough within which the garter spring 29 is retained against axial displacement. Although the lips 37 are shown on all fingers 36 which are visible in the drawings it might be feasible, for use with certain types of garter springs, to provide such spring-retaining lips on less than all said fingers but in sufficient number and so distributed around the carrier as to serve the purposes of this invention.

Figure 1:
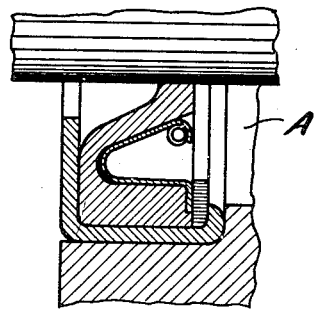

The peripheral flange 33 may be molded into the body portion 23 of the sealing ring in the position shown in Fig. 1 or the said flange may be clamped in an annular rabbet 38 in the sealing element by the retaining ring 27.

As hereinbefore suggested, the material of which the spring-carrier 30 is made, particularly at the curved portion 39 thereof, may be pliant material or resilient or spring material. If of pliant material, the flange 32 of the spring-carrier may pivot with the sealing flange 25 and the sealing lip 26 inwardly to the position thereof shown in Fig. 2 and outwardly to the position thereof shown in Fig. 1 or even further outwardly in case of malalignment; the said flanges 32 and 25 being urged inwardly by the force of the garter spring 29. If the spring-carrier 30 is of resilient or spring material it may have a spring action either opposed to or supplemental to the action of the garter spring 29. Regardless of which type of suggested material is employed in the spring-carrier, the latter serves as a hard bearing surface upon which the coils of the garter spring bear without being subjected to any material snubbing tendency by said carrier, thus eliminating objectionable snubbing and wear which might be encountered if the garter spring were to bear directly upon the relatively soft material of the sealing ring and become somewhat imbedded therein.

It should be observed that, particularly in oil seals for large shafts, the use of a garter spring is highly advantageous but that a difficult problem was involved in providing means for holding such a spring within an assembled unitary seal at all times. The difficulty may be understood by reference to Figs. 1 and 2 and assuming that the shaft B is, say, thirty times the sectional diameter of the oil seal which latter diameter may be as little as one inch. In such a structure the shaft could have a permissible lateral displacement of as much as one-fourth of an inch thus making it necessary to provide at D, between the shell flange 22 and the surface of the shaft B, a clearance about one-fourth as large as the sectional diameter of the oil seal.

Viewing the oil seal in its condition when in position with respect to a shaft, as illustrated in Fig. 1, it may be seen that if the flanges 32 of the spring-carrier and 25 of the sealing element were slightly shortened, the retaining ring 38 could be extended inwardly to the point indicated by the broken line and arrow 40 and yet leave adequate clearance about the shaft to allow for substantial lateral displacement. By so extending the ring 38 inwardly, the latter, in the absence of the spring carrier 30, would serve as an abutment preventing dislodgement of the garter spring 29. The ring 38, however, could not be extended inwardly to a greater extent than indicated by arrow 40 in both Figs. 1 and 2 and still afford adequate clearance to allow for substantial lateral displacement of the shaft; hence, before the unitary oil seal is put into a machine or before the shaft is put into place the sealing flange 25 and lip 26 are flexed inwardly by the spring 29 substantially to their positions indicated in Fig. 2, and from the latter figure it is apparent that in the absence of the spring-carrier 30 and, more particularly, the spring-retaining lip 37 thereof, there would be nothing to prevent the spring 29 from passing through the space between the supposedly extended retaining ring 27 and the sealing lip 26, thus to become dislodged from the assembly.

The advantage of having a fully assembled unitary oil seal, which may not be become disassembled unintentionally, is well understood and the foregoing indicates the difficulty of forming the shell 20 or any part thereof to hold the garter spring in place in circumstances wherein substantial permissible malalignment is encountered. The mentioned difficulty is overcome and the advantages of such an assembly are obtained by the present invention.

Garter springs for use in oil seals have commonly been in the form of an endless circular coil spring, and such a spring may be employed in the present invention. It may be found advantageous, however, particularly in oil seals for large shafts, for the garter spring 29 to include features disclosed in Figs. 3 and 10–14, whereby to more effectively apply adequate spring pressure upon the sealing lip 26 despite the necessarily small diameter of the spring and its relatively great circumferential length.

As shown particularly in Fig. 10, a garter spring 29 suitable for use in the invention may have at least one extensible portion or section 41, in the form of a coiled spring, suitably connected at its opposite ends to the opposite ends of a frustro-circular non-extensible but somewhat flexible portion or section 42.

Fig. 11 illustrates another form of garter spring 29, which is a variation of the structure of Fig. 10, having, however, plural coil-spring sections 43 interconnected, alternately with plural arcuate non-extensible sections 44, in the form of a circle. The sections 44, preferably but not necessarily, should be somewhat flexible.

Figs. 12–14 illustrate several of numerous ways in which the extensible spring sections and non-extensible sections of the disclosed form of garter spring may be interconnected. As shown in Fig. 12 the said sections respectively are provided with loops 45, 46 which are linked into each other to form a connection. Another way to interconnect the several garter spring sections is shown in Fig. 13, wherein an externally threaded end portion 47 is provided on each end of the non-extensible section, onto which several coils toward the ends of the adjacent spring or springs are adapted to be threaded. Still another spring-section interconnection arrangement is shown in Fig. 14, wherein an internally threaded end portion 48 is provided on each end of the non-extensible section, into which several coils toward the ends of the adjacent spring or springs are adapted to be threaded.

Where the described thread interconnections are used for the spring sections, they, or at least the last such connection being made to complete the circular form of the garter spring, may be effected by holding the non-extensible section against turning, and turning the adjacent end of the spring oppositely to the direction of the thread to store a torque load in the spring, then inserting the said spring end into or onto the threaded portion of the non-extensible section and thereupon releasing the end of the spring to permit the stored torque load therein to turn the end of the spring into secure threaded relation to the non-extensible section. As shown in Figs. 12–14, the non-extensible sections, preferably, are of material of a diameter greater than that of the material of which the spring sections are made, but are of a diameter somewhat less than the overall diameter of a spring section.

Fig. 5 illustrates one of various possible modifications of the spring carrier, wherein the carrier 49 is substantially identical in cross-section to the carrier 30 of Fig. 4 but has a continuous annular peripheral flange 50 carrying a circular series of fingers 51 having spring-retaining lips 52 formed on the free ends of said fingers. The flange 50 may be clamped in place by the retaining ring 27 similarly to the manner in which the flange 33 of carrier 30 is clamped as illustrated in Fig. 1.

Figure 2:
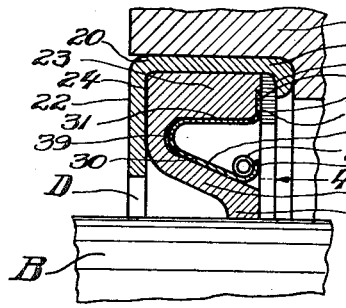
Fig. 2 is a sectional view corresponding to the upper portion of Fig. 1, illustrating substantially the dormant condition of the sealing element when the oil seal is disassociated from the mentioned shaft.
Figure 2:
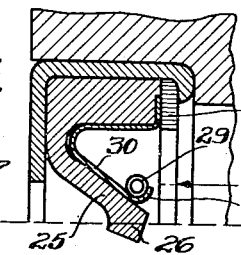
Figure 6:
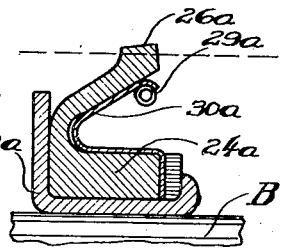

The embodiment illustrated in Fig. 6 differs from the embodiment of Fig. 1 chiefly in that the lateral extensions of the various parts 20a, 24a, and 30a of the seal corresponding to parts 20, 24, and 30 in Fig. 1 are reversed to adapt the device to be force-fitted onto the shaft B with the sealing lip 26a extending about the periphery of the seal in position to coact with a surrounding casing which is indicated by a broken horizontal line. These mentioned parts are otherwise similar to the corresponding parts in Fig. 1. The garter spring 29a, however, should be a compression spring which will urge the sealing lip 26a outwardly to effect a wiping seal with the cylindrical inner surface of the opening for the shaft in the casing C. Obviously the coil-spring sections 41 and 43 may be of the compressible type to render the garter spring suitable for use in the embodiment of Fig. 6.

Figure 7:
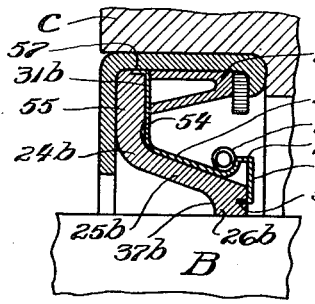
Figure 8:
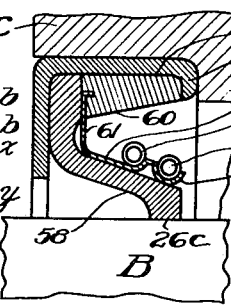
Figure 9:
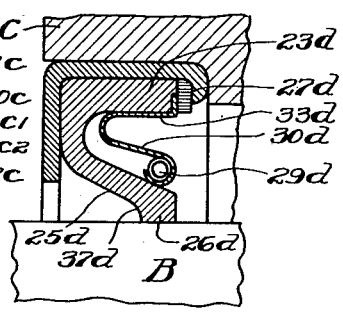

In the embodiments as illustrated in Figs. 7, 8, and 9, the seals are force-fitted into the casing C and the sealing lips 26b, c and d effect a wiping sealing contact with the shaft B, although, obviously these types of seals could be of reverse form so that their sealing lips would coact with the inner cylindrical surface of the casing C instead of with the shaft B as illustrated.

As illustrated in the embodiment of Fig. 7, the spring-carrier 30b may have channel-shaped end portions 53 the outer flange 53x of each of the latter being preferably integral with the outer end of the spring-retaining lip 37b of the spring-carrier and the inner flange 53y of the end portion 53 being imbedded in the side of the sealing lip 26b, thereby assuring intimate relation of the carrier 30b and the flange 25b of the sealing element at all times, independently of the action of the garter spring 29b. The spring-carrier 30b, also, may have a radial flange 54, held firmly between a radial flange 55 of the sealing element and a filler ring 56. The latter may preferably be of any suitable material capable of firmly holding the flanges 54 and 55 in place and is shown as a ring of V-shaped cross-section. The ring 56 may advantageously be of suitable metal or a filler ring of other design or of other material, preferably much harder than the sealing ring, may be employed. As a means of more securely holding the spring-carrier 30b in position it may be provided with a peripheral flange 57 fitting within a suitable annular rabbet in the flange 55 of the sealing element.

As illustrated in the embodiment of Fig. 8, the spring-carrier 30c may be adapted to retain two garter springs 29c1 and 29c2 in place. A spring-retaining lip 37c serves to engage spring 29c2 at one side to hold it against displacement and the spring-carrier is bent outwardly at the opposite side of spring 29c2 as at 58 to hold spring 29c1 in place independently of spring 29c2. In this embodiment, there is employed a solid filler ring 59 of substantially the same general shape as ring 56 in Fig. 7, and a peripheral flange 60 on a radial flange 61 of the spring-carrier 30c extends into a suitable annular recess in the filler ring 59 to more securely hold the spring-carrier 30c against displacement. This embodiment shows, also, that the retaining ring 27 of Fig. 1 can be dispensed with and the locking lip 28c swaged over, directly against the filler ring to keep the parts of the device in assembled condition.

In another embodiment, as shown in section in Fig. 9, the spring-carrier 30d is substantially S-shaped, with a peripheral flange 33d held firmly between the body portion 23d of the sealing element and the retaining ring 27d, as with the embodiment of Fig. 1. The outer portion of the spring-carrier is in intimate contact with the inner surface of the body portion 23d of the sealing element, thence the spring-carrier extends inwardly, clear of the sealing element, in a reverse curve; the inner end of the spring-carrier constituting a spring-retaining lip 37d which extends between the spring 29d and the sealing flange 25d, contacting the latter only near its free end, thereby localizing the pressure of said spring at the sealing lip 26d.

It should be apparent, from the foregoing, that the present invention effectually solves the problem of retaining a garter spring in place, at all times, in an oil seal assembly. It also presents effective means for preventing objectionable snubbing action between the garter spring and the sealing element. In doing these things it also imparts to the oil seal the facility for maintaining the necessary oil sealing effect even in the presence of very substantial malalignment of machine parts with which the invention is employed.

Consideration of the several illustrated embodiments, also, should make it clear that the present inventive concept may be practiced in many different structural arrangements without, however, departing from the invention as defined in the following claims.

What I claim is:

1. A device for sealing an annular space between a substantially fixed machine element and a rotatable shaft extending into an opening in said element, said device comprising a sealing ring having a mounting portion adapted for disposition in sealing relation to said machine element, and an axially extending sleeve-like sealing flange having a sealing surface adapted to effect a running seal with the said shaft, the said flange being capable of substantial pivotal movement to an extreme position in which it tapers at a substantial angle with respect to said ring's axis; a circular pressure member supported by said flange at the side thereof remote from said sealing surface and adapted to urge said flange into such running seal relationship, the force in said pressure member, exerted radially upon said flange when the latter is in such a tapering position, tending to move the said pressure member axially to disassociate it from said flange; and a pivotal pressure member restraining element of substantially hard, bendable material, having a first portion extending immediately between and in contact with said pressure member and said flange at a first circumferential line of contact with said pressure member, and a second portion, in contact with said pressure member at the side thereof nearest the free edge of said flange at a second circumferential line of contact removed from said first contact line, the said second portion of said restraining element constituting an abutment preventing material axial shifting of said pressure member from such contact at said first contact line irrespective of the angular position of the said flange or any circumferential portion thereof.

2. A device according to claim 1, further characterized in having a plurality of said pressure members supported by said sealing flange and in that the said pressure member restraining element has a plurality of each of the mentioned first and second contact portions, one of each of said contact portions being provided in relation to each of said pressure members.

3. A device according to claim 1, further characterized in that the said pressure member restraining element is turned in at its free end toward the said sealing flange of the sealing ring to form a hook substantially embracing and holding the circular pressure member, the contact of said restraining element with the said flange being substantially localized adjacent the said pressure member whereby to similarly localize the pressure of the latter upon said sealing flange.

4. A device according to claim 1 further characterized in that the said pressure member restraining element extends from the mounting portion of the sealing ring in spaced relation to the latter's sealing flange substantially to a point near the free edge thereof, thence the restraining element curves back upon itself toward the said flange to substantially embrace the pressure member and prevent its axial movement toward the free edge of said flange, the said curved-back portion extending between the pressure member and the said flange in contact with the latter, whereby to afford a bearing surface for said pressure member to obviate snubbing action of the latter with respect to the sealing flange.

5. A device for sealing an annular space between a substantially fixed machine element and a rotatable shaft extending into an opening in said element, said device comprising a sealing ring having an annular fixed portion adapted for disposition in fixed sealing relation to said machine element and a flexible, sleeve-like sealing flange pivotally joined at one of its ends to said fixed portion to pivot in a radial plane and having an annular inner sealing surface for effecting a running seal with such a shaft, a garter spring encircling said sealing flange and coacting therewith to maintain effectively said running seal, and means for retaining said spring comprising an axially-extending pivotal portion of substantially harder material than said flange, disposed about the latter and extending between said flange and said spring with one end of said pivotal portion pivotally connected to the fixed portion of the sealing ring at a plane remote from the plane of the free edge of the flange in the direction of the latter's pivot point and adapted to pivot radially in unison with the latter, and having, toward its other end, radially extending spring-retaining portions integral with said pivotal portion and coacting with the spring to prevent the latter from shifting beyond the free edge of the sealing flange.

6. A device for sealing an annular space between a substantially fixed machine element and a rotatable shaft extending into an opening in said element, said device comprising a sealing ring having an annular fixed portion adapted for disposition in fixed sealing relation to said machine element and a flexible, sleeve-like sealing flange pivotally joined at one of its ends to said fixed portion to pivot in a radial plane and having an annular inner sealing surface for effecting a running seal with such a shaft, a garter spring encircling said sealing flange and coacting therewith to maintain effectively said running seal, and means for retaining said spring comprising an annular element of flat metal having a marginal portion circumferentially anchored to the fixed portion of the sealing ring at a point adjacent to the pivot point of the sealing flange and a plurality of flexible fingers extending axially from said marginal portion, over the exterior of the sealing flange and between the latter and said spring, and said fingers having integral radially-outwardly extending hooks adjacent their ends coacting with the spring to prevent it from axial shifting beyond the free edge of the sealing flange.

7. A device adapted to seal an annular space between two relatively movable machine elements, comprising an annular shell adapted to be mounted in fluid-tight relation to a first of said machine elements, a sealing ring having a mounting portion in fluid-tight engagement with said shell, and a flexible, sleeve-like sealing portion extending axially from said mounting portion and adapted to be held in sealing contact with the second of said machine elements, an annular coil-spring supported by said sleeve-like sealing portion at the side of the latter remote from the sealing surface of said second machine element and adapted to urge the sleeve-like sealing portion toward the said sealing surface, and a spring-carrier of substantially hard, bendable material having an anchor portion, held in fixed position relatively to the mounting portion of the sealing ring, a pivotal portion extending from said anchor portion and including a spring-bearing portion extending between the sleeve-like sealing portion and the spring, and a spring-retaining lip adjacent the spring-bearing portion, adapted substantially to engage the side of the spring whereby to prevent axial displacement of the latter under any condition of flexing within the capacity of the flexible sealing portion, further characterized in that the spring-carrier has a portion extending from the spring-retaining lip and into the material of the flexible sleeve-like sealing portion of the sealing ring, thereby constraining the pivotal portion of the spring-carrier to move in unison with the said flexible sealing portion.

8. A device adapted to seal an annular space between two relatively movable machine elements, comprising an annular shell adapted to be mounted in fluid-tight relation to a first of said machine elements, a sealing ring having a mounting portion in fluid-tight engagement with said shell, and a flexible, sleeve-like sealing portion extending axially from said mounting portion and adapted to be held in sealing contact with the second of said machine elements, an annular coil-spring supported by said sleeve-like sealing portion at the side of the latter remote from the sealing surface of said second machine element and adapted to urge the sleeve-like sealing portion toward the said sealing surface, and a spring-carrier of substantially hard, bendable material having an anchor portion, held in fixed position relatively to the mounting portion of the sealing ring, a pivotal portion extending from said anchor portion and including a spring-bearing portion extending between the sleeve-like sealing portion and the spring, and a spring-retaining lip adjacent the spring-bearing portion, adapted substantially to engage the side of the spring whereby to prevent axial displacement of the latter under any condition of flexing within the capacity of the flexible sealing portion, further characterized in that the spring-carrier has an integral channel-shaped extension, one side of which adjoins the said spring-retaining lip and the other side of which extends into the free end of the sleeve-like sealing portion of the sealing ring, thereby constraining the pivotal portion of the spring-carrier to move in unison with the said flexible sealing portion.

ALBERT M. CHAMBERS, Jr.

REFERENCES CITED

The following references are of record in the file of this patent:

UNITED STATES PATENTS

| Number | Name | Date |
|---|---|---|
| 251,483 | Stiles | Dec. 27, 1881 |
| 2,076,747 | Salisbury | Apr. 13, 1937 |
| 2,088,703 | Hubbard et al. | Aug. 3, 1937 |
| 2,089,461 | Winter | Aug. 10, 1937 |
| 2,132,010 | Barry | Oct. 4, 1938 |